(12) United States Patent
Ueno

(10) Patent No.: US 7,069,107 B2
(45) Date of Patent: Jun. 27, 2006

(54) SPECTACLE LENS MANUFACTURING METHOD AND SPECTACLE LENS SUPPLY SYSTEM

(75) Inventor: Yasunori Ueno, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/902,298

(22) Filed: Jul. 30, 2004

(65) Prior Publication Data
US 2005/0004694 A1      Jan. 6, 2005

Related U.S. Application Data

(62) Division of application No. 10/069,394, filed as application No. PCT/JP01/09431 on Oct. 27, 2001, now Pat. No. 6,817,713.

(30) Foreign Application Priority Data

Oct. 27, 2000   (JP)  ............................. 2000-329259
Sep. 5, 2001    (JP)  ............................. 2001-269368

(51) Int. Cl.
    *G06F 19/00*  (2006.01)
(52) U.S. Cl. .................. 700/182; 351/41; 351/227; 33/200; 33/507; 382/117
(58) Field of Classification Search .............. 700/182, 700/186; 351/41, 177, 178, 227, 246, 207, 351/204, 205; 33/200, 507; 382/117, 276; 396/18
See application file for complete search history.

(56) References Cited

U.S. PATENT DOCUMENTS

| | | | |
|---|---|---|---|
| 5,485,399 A | 1/1996 | Saigo et al. | 351/178 |
| 5,592,248 A * | 1/1997 | Norton et al. | 351/246 |
| 5,710,615 A | 1/1998 | Kitani | 351/169 |
| 5,767,940 A | 6/1998 | Hayashi et al. | 351/205 |
| 5,790,232 A | 8/1998 | Hagiwara et al. | 351/177 |
| 5,983,201 A * | 11/1999 | Fay | 705/27 |
| 6,142,628 A * | 11/2000 | Saigo | 351/204 |
| 6,199,983 B1 | 3/2001 | Kato et al. | 351/169 |
| 6,231,188 B1 * | 5/2001 | Gao et al. | 351/227 |
| 6,419,549 B1 | 7/2002 | Shirayanagi | 451/5 |
| 6,511,180 B1 | 1/2003 | Guirao et al. | 351/211 |
| 2002/0039171 A1 | 4/2002 | Shtrayanagi et al. | 351/159 |

FOREIGN PATENT DOCUMENTS

| | | |
|---|---|---|
| EP | 0 299 690 A2 | 7/1987 |
| EP | 0 710 526 A1 | 5/1996 |
| JP | A 6-34923 | 2/1994 |
| WO | WO 00/48035 | 8/2000 |

* cited by examiner

*Primary Examiner*—Leo Picard
*Assistant Examiner*—Chad Rapp
(74) *Attorney, Agent, or Firm*—Oliff & Berridge, PLC

(57) ABSTRACT

The difference in optical performance, such as astigmatism, the radius of curvature of a first surface, etc., of left and right lenses is kept at or below a specific level, and the difference in optical performance and the radius of curvature of the first surfaces between new and old lenses when the wearer changes lenses is also kept at or below a specific level, the result being lenses that are more comfortable to wear and are more attractive.

4 Claims, 14 Drawing Sheets

FIG.2

| | | | | |
|---|---|---|---|---|
| 60 | INQUIRY | | | |
| 65 | 10 | ORDERING OFFICE (077801) | DELIVERED TO (077801) | SHIPPING METHOD ( ) |
| | 20 | D CATEGORY ( ) | TYPE (4)HELP | METS MACHINING (3) UNSPECIFIED |
| 61 | 31 | LENS ( HL | | LENS L ( |
| | 32 | ( HL | | ( |
| 62 | | Sph Cyl Ax Add | | MACHINING 1 MACHINING 2 MACHINING 3 BINOCULAR VISION BALANCE DESIGN |
| | 41 | R(+1.00) (0.00) ( ) ( ) ( ) | | ( ) ( ) ( ) ( YES ) |
| | 42 | L(+3.00) ( ) ( ) ( ) | | ( ) ( ) ( ) ( YES ) |
| 63 | 51 | MFR. SKU SIZE | EDGING | TYPE |
| | 52 | FRAME (NL059T) (16-135) ( | 0000 | METAL |
| 64 | | PD NPD SEG ET EP | BEVEL MODE POSITION | FORM |
| | 61 | R (33.0) ( ) ( ) ( ) ( ) ( ) | (4) AUTO (0.0mm) | (0) SMALL |
| | 62 | L (33.0) ( ) ( ) ( ) ( ) ( ) | (4) AUTO (0.0mm) | (0) SMALL |
| | 70 | | | |
| | 80 | REMARKS (HELP | | |

CORRECTION/DELETION No. ( ) NAME : MR./MS _____ (CORRECTION : No. [I]    DELETION : No. [II] )

FIG.4

(a) CUSTOMER PERSONAL DATA

| ID | . . . . . . . . . . |
|---|---|
| NAME | . . . . . . . . . . |
| TELEPHONE NUMBER | . . . . . . . . . . |
| ADDRESS | . . . . . . . . . . |
| DATE OF BIRTH | . . . . . . . . . . |
| AGE | . . . . . . . . . . |
| OCCUPATION | . . . . . . . . . . |
| HOBBIES | . . . . . . . . . . |
| ORDERING LAB | . . . . . . . . . . |
| ORDER DATE | . . . . . . . . . . |
| OFFICE PLACING ORDER | . . . . . . . . . . |
| OFFICE ADDRESS | . . . . . . . . . . |
| OFFICE TEL. NUMBER | . . . . . . . . . . |

(b) PRESCRIPTIONS REGISTERED FOR THE FIRST TIME

| CATEGORY | MYOPIA, ASTIGMATISM | | | | | |
|---|---|---|---|---|---|---|
| PRIMARY COMPLAINT | PRESCRIPTION NO LONGER FITS | | | | | |
| INTENDED USE | EVERYDAY USE | | | | | |
| NUMBER OF TIMES ORDERED | FIRST TIME | | | | | |
| | SPH | CYL | AXS | ADD | PD | VA |
| R | −1.00 | −0.50 | 180 | | 32 | 0.7 |
| L | −1.25 | −0.25 | 5 | | 31 | 0.6 |
| FRAME NUMBER | 123T456 | | FRAME NAME | HOYA SCOUT MASTER | | |

|  | -2D |
|---|---|
| FIRST SURFACE RADIUS OF CURVATURE (mm) | 125.333 |
| SECOND SURFACE RADIUS OF CURVATURE (mm) | 83.333 |
| CENTER THICKNESS (mm) | 1.0 |
| LENS DIAMETER (mm) | 70 |
| EDGE THICKNESS (mm) | 3.7 |

|  | -4D |
|---|---|
| FIRST SURFACE RADIUS OF CURVATURE (mm) | 167.000 |
| SECOND SURFACE RADIUS OF CURVATURE (mm) | 71.429 |
| CENTER THICKNESS (mm) | 1.0 |
| LENS DIAMETER (mm) | 70 |
| EDGE THICKNESS (mm) | 6.3 |

|  | -2D |
|---|---|
| FIRST SURFACE RADIUS OF CURVATURE (mm) | 125.333 |
| SECOND SURFACE RADIUS OF CURVATURE (mm) | 83.333 |
| CENTER THICKNESS (mm) | 1.0 |
| LENS DIAMETER (mm) | 70 |
| EDGE THICKNESS (mm) | 3.7 |

|  | -4D |
|---|---|
| FIRST SURFACE RADIUS OF CURVATURE (mm) | 167.000 |
| SECOND SURFACE RADIUS OF CURVATURE (mm) | 71.429 |
| CENTER THICKNESS (mm) | 1.0 |
| LENS DIAMETER (mm) | 70 |
| EDGE THICKNESS (mm) | 6.3 |

FIG. 15
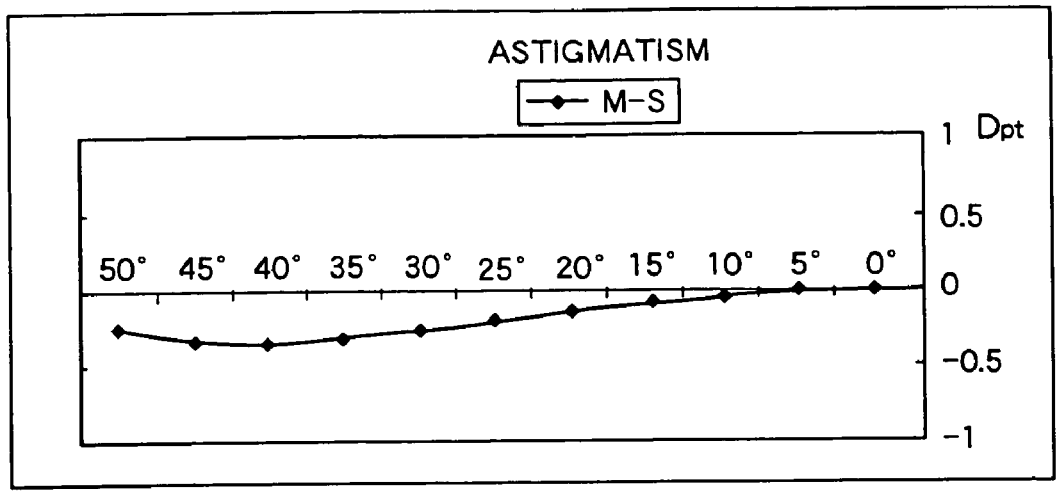
FIG. 16
|  | -4D |
|---|---|
| FIRST SURFACE RADIUS OF CURVATURE (mm) | 125.647* |
| SECOND SURFACE RADIUS OF CURVATURE (mm) | 62.578 |
| CENTER THICKNESS (mm) | 1.0 |
| LENS DIAMETER (mm) | 70 |
| EDGE THICKNESS (mm) | 6.8 |
* : ASPHERICAL SURFACE
FIG. 17
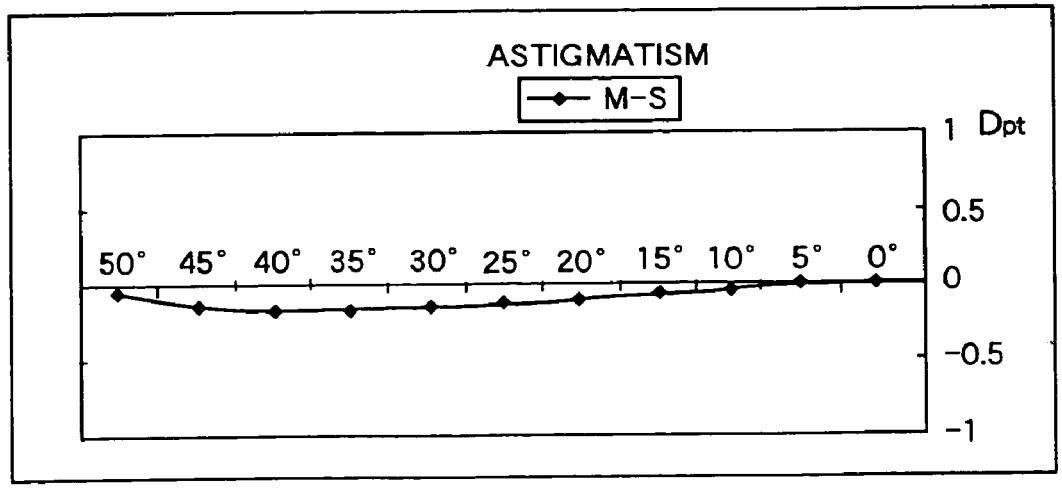

|  | −1D | −3D |
|---|---|---|
| FIRST SURFACE RADIUS OF CURVATURE (mm) | 91.242 | 117.980 |
| SECOND SURFACE RADIUS OF CURVATURE (mm) | 76.923 | 68.966 |
| CENTER THICKNESS (mm) | 1.0 | 1.0 |
| LENS DIAMETER (mm) | 65 | 65 |
| EDGE THICKNESS (mm) | 2.2 | 4.6 |
| OVERALL HEIGHT (mm) | 8.2 | 9.1 |

|  | −1D |
|---|---|
| FIRST SURFACE RADIUS OF CURVATURE (mm) | 117.980* |
| SECOND SURFACE RADIUS OF CURVATURE (mm) | 95.238 |
| CENTER THICKNESS (mm) | 1.0 |
| LENS DIAMETER (mm) | 65 |
| EDGE THICKNESS (mm) | 2.1 |
| OVERALL HEIGHT (mm) | 6.7 |

* : ASPHERICAL SURFACE

FIG.23
|  | +1D(left) | +3D(right) |
|---|---|---|
| FIRST SURFACE RADIUS OF CURVATURE (mm) | 91.609 | 62.106 |
| SECOND SURFACE RADIUS OF CURVATURE (mm) | 111.111 | 95.238 |
| CENTER THICKNESS (mm) | 2.1 | 4.5 |
| LENS DIAMETER (mm) | 65 | 65 |
| EDGE THICKNESS (mm) | 1.0 | 1.0 |
| OVERALL HEIGHT (mm) | 7.0 | 10.2 |
(REFRACTIVE INDEX n OF LENS = 1.5, OBJECT POINT : INFINITY)
FIG.24
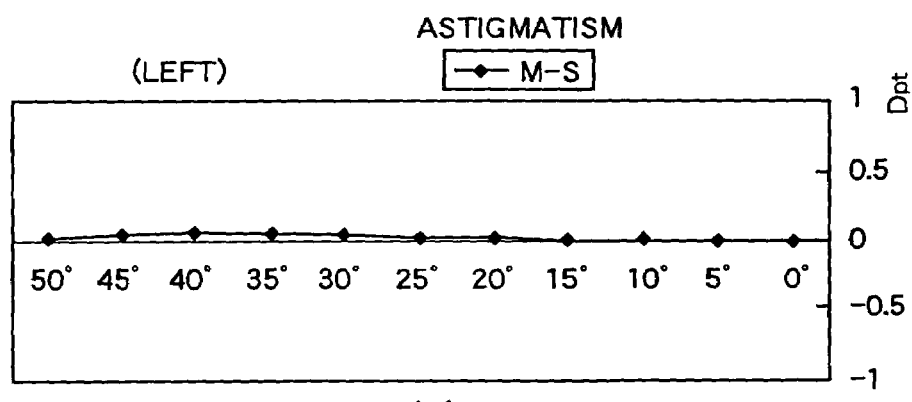
(a)
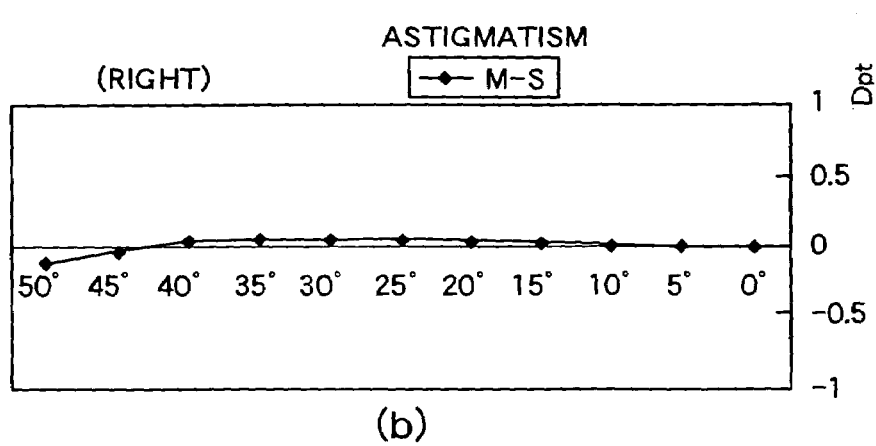
(b)

FIG.25

AFTER REDESIGN

|  | +3D(right) |
|---|---|
| FIRST SURFACE RADIUS OF CURVATURE (mm) | 92.242* |
| SECOND SURFACE RADIUS OF CURVATURE (mm) | 200.000 |
| CENTER THICKNESS (mm) | 4.0 |
| LENS DIAMETER (mm) | 6.5 |
| EDGE THICKNESS (mm) | 1.0 |
| OVERALL HEIGHT (mm) | 6.7 |

\* : ASPHERICAL SURFACE

SPECTACLE LENS MANUFACTURING METHOD AND SPECTACLE LENS SUPPLY SYSTEM

This is a Division of application Ser. No. 10/069,394 filed Apr. 15, 2002 now U.S. Pat. No. 6,817,713, which in turn is a National Stage of PCT/JP01/09431 filed on Oct. 27, 2001. The entire disclosure of the prior application is hereby incorporated by reference herein in its entirety.

TECHNICAL FIELD

This invention relates to a supply system equipped with a lens design function, with which a spectacle lens with good appearance and optical performance can be obtained even when the difference in prescription, such as the diopter, between the left and right eyes is over a specific amount, and furthermore with which optical performance can be taken into account when the wearer changes his or her prescription and new spectacles are produced, or when the eyewear history of a customer is updated.

BACKGROUND ART

There are already known systems for the online ordering of spectacle lenses (see Japanese Patent No. 2,982,991, for instance). With this conventional system, a computer is set up on the side where the spectacle lenses are ordered, and a manufacturer-side computer is connected to this order-side computer so as to allow the exchange of information, with this computer executing order receipt processing such as obtaining lens design data on the basis of order information such as a lens prescription transmitted from the order-side computer. The order-side computer and the manufacturer-side computer perform computational processing according to specific input operations, and perform the processing necessary for placing and taking orders for spectacle lenses while exchanging information with each other.

In prescribing spectacle lenses that correct the vision of a patient's eyes, lenses of the same refractive power (diopter) are prescribed when the left and right eyes both have the same visual acuity, so the curvature of the first refractive surface and the second refractive surface is also the same, and the optical performance, such as astigmatism, curvature of field, and distortion, is also the same. If the visual acuity of the left and right eyes is not the same, however, lenses having different refractive power (diopter) will of course be prescribed.

According to Tscherning's ellipse, which Tscherning discovered as a geometric solution for eliminating astigmatism of a spectacle lens, the optimal base curve for eliminating astigmatism (the refractive power of the first refractive surface) varies. Consequently, if the visual acuity differs between the left and right eyes, the base curve of the left and right lenses must also be different according to Tscherning's ellipse.

Therefore, when lenses are designed according to Tscherning's ellipse, if there is a great difference in visual acuity between the left and right eyes as above, the left and right base curves will also be markedly different.

This means that the curved surface shape of the left and right spectacle lenses looks very unbalanced when the spectacles are viewed from the outside. Consequently, although optical performance is good, the appearance is quite poor.

Furthermore, since the curved surface shape is different for each individual lens on the lens manufacturer side, another disadvantage is higher manufacturing costs.

Accordingly, the same base curve is sometimes used within a specific diopter range in order to lower the manufacturing costs. However, lenses manufactured by this method may have a base curve that is not exactly optimal, so a problem is that the optical performance is inevitably inferior.

Naturally, if the base curves are merely made the same on the left and right in order to improve the appearance, optical performance will be markedly deteriorated in some cases. Thus, if emphasis is placed on the optical performance of the lenses, the cost will be higher and there will be cases in which appearance suffers. On the other hand, the problem with improving the appearance is that the optical performance may suffer.

Also, juvenile myopia tends to increase over time up to a certain age, and this is accompanied by changes in the prescription values for the spectacle lenses. Some wearers, however, are physiologically sensitive to changes in prescription values. That is, they experience severe discomfort when they wear lenses manufactured with a new prescription, and in some cases the body itself may be affected. These symptoms may appear even in regular customers, although not pronounced.

Research conducted by the inventors seems to indicate the primary cause of this to be as follows.

When a lens prescription changes, lenses having a curved surface shape and so forth that match this new prescription are newly designed and manufactured for supply to the customer. In this case, it is not uncommon for the newly designed and manufactured lenses that match the new prescription to have optical performance (astigmatism, curvature of field, and distortion) that is different from the optical performance of the old lenses designed to match the old prescription.

It is believed that symptoms such as discomfort will most often appear if this difference in optical performance goes beyond a certain level.

Thus, the difference in optical performance has been a serious problem, one that occurs due to a diopter difference in prescription lenses resulting from differences between the left and right eyes, or to a diopter difference between new and old lenses.

Unfortunately, the physician who gives the prescription and the business placing the order (such as an optician) do not have access to information about lens design, which has made it difficult to solve this problem.

Also, the existing spectacle lens supply systems mentioned above merely involved having the ordering side (such as an optician) specify lenses to a lens manufacturer, who then supplied the lenses, and no function was in place for solving the above-mentioned problem.

The present invention was conceived in light of the above situation, and it is an object thereof to provide a spectacle lens manufacturing method and a spectacle lens supply method with which good optical performance and good appearance can be both be achieved.

DISCLOSURE OF THE INVENTION

The first means for solving the above problem is a spectacle lens supply method, in which a computer is set up on a spectacle lens order side and a computer that is connected to this order-side computer such that information can be mutually exchanged is provided on the manufacturer side, and spectacle lenses are supplied by having the order-side computer and the manufacturer-side computer perform computations according to specific input operations and perform the processing required for the taking and/or placing of orders for spectacle lenses while exchanging information with each other, characterized in that when spectacle lens information, spectacle frame information, prescription values, layout information, processing instructions information, and other such processing condition data required for processing is transmitted by the order-side computer to the manufacturer-side computer, a lens design program installed on the manufacturer-side computer performs optical lens design tailored to the customer on the basis of the transmitted data for lens information so that the optical performance of the left and right lenses will be similar, and the lenses are manufactured according to this design.

The second means is the spectacle lens supply method according to the first means, wherein the lens design program further performs optical lens design that approximates the left and right base curves to each other.

The third means is the spectacle lens supply method according to the first means, wherein the optical performance consists of at least one of astigmatism, curvature of field, and distortion.

The fourth means is the spectacle lens supply method according to the first means, comprising the steps of:

selecting the left and right lenses from a lens design table prepared on the basis of prescription values when the lens design program approximates the optical performance of the left and right eyes to each other;

comparing the convex surface base curve difference between the selected left and right lenses; and when this base curve difference is over a predetermined standard, performing lens redesign in which the convex surface curve of one lens is made to have an aspherical shape similar to that of the convex surface curve of the other lens so that the astigmatism is substantially the same.

The fifth means is the spectacle lens supply method according to the second means, wherein the optical lens design is such that the difference in convex surface base curves of the left and right spectacle lenses is no more than 1 D.

The sixth means is the spectacle lens supply method according to the second means, wherein a display means for comparing data including the lens shape before the curve matching and the prescription data for this lens, to data including the lens shape after the curve matching and the prescription data for this lens, is transferred to and displayed at the computer set up on the side where spectacle lens is ordered.

The seventh means is a spectacle lens supply system, comprising a computer set up on a spectacle lens order side and a manufacturer-side computer that is information exchangeably connected to this order-side computer and has a customer database including spectacle lens prescription data and lens design data, in which the order-side computer and the manufacturer-side computer perform computations according to specific input operations and perform the processing required for the taking and/or placing of orders for spectacle lenses while exchanging information with each other, wherein the manufacturer-side computer has the function of performing lens design such that a customer will experience substantially no discomfort originating in an optical performance difference when changing from old to new lenses, by selecting or producing new design data for a lens on the basis of customer spectacle lens processing condition data required for processing, such as spectacle lens information, spectacle frame information, prescription values, layout information, and processing instructions information, when this data is transmitted from the order-side computer to the manufacturer-side computer, and making the optical performance of the new lenses produced with this new design data approximate the optical performance of the old lenses produced with the old design data based on the old prescription values of the pre-registered customer database.

The eighth means is a spectacle lens supply system, comprising a computer set up on a spectacle lens order side and a manufacturer-side computer that is information exchangeably connected to this order-side computer and has a customer database including spectacle lens prescription data and lens design data, in which the order-side computer and the manufacturer-side computer perform computations according to specific input operations and perform the processing required for the taking and placing of orders for spectacle lenses while exchanging information with each other, wherein, when customer spectacle lens processing condition data required for processing, such as spectacle lens information, spectacle frame information, prescription values, layout information, and processing instructions information, is transmitted from the order-side computer to the manufacturer-side computer, the manufacturer-side computer has the function of performing processing comprising:

a step of checking whether there is any old prescription data for that customer;

a step of selecting or producing lens design data matching the new prescription values as lens design data for the new prescription values if no old data for that customer exists in the manufacturer-side computer, and setting this data as the design data for producing the new lenses;

an optical performance comparison step in which, if there is old prescription data for the customer, the new lens design data for the new prescription values is selected or produced, and the optical performance of the new lenses designed on the basis of the newly selected or produced new design data is compared to the optical performance of the old lenses designed with the old design data matching the old prescription values; and a step in which, when the results of comparing the optical performance as above indicate that the optical performance difference is within a range such that the customer will experience substantially no discomfort originating in an optical performance difference when changing from old to new lenses, the selected or produced new design data is set as the design data for producing the new lenses, and when said difference goes outside a range in which the customer will experience substantially no discomfort originating in an optical performance difference when changing from old to new lenses, new design data is newly selected or produced for putting the optical performance difference within said range before returning to said optical performance comparison step and such processing is repeated until the optical performance difference is within said range.

The ninth means is the spectacle lens supply system according to the seventh or eighth means, wherein the newly determined new design data is registered for the first time or updated in the customer database.

The tenth means is the spectacle lens supply system according to the seventh or eighth means, wherein, when there is old prescription data for the customer, a step is provided for comparing the difference between the old and new prescription values, and if this difference is not over 0.5 D as the diopter difference, the new lens design data for the new prescription values is selected or produced without performing the optical performance comparison step, and this data is set as the design data for producing the new lenses.

The eleventh means is the spectacle lens supply system according to the seventh or eighth means, wherein the lens design data is such that the difference in the curve of a first refractive surface of the left and right spectacle lenses is no more than 1 D.

The twelfth means is the spectacle lens supply system according to the seventh or eighth means, wherein the optical performance is at least one of astigmatism, curvature of field, and distortion.

The thirteenth means is the spectacle lens supply system according to the seventh or eighth means, wherein the curvature of at least one of the first refractive surfaces of the left and right spectacle lenses is selected such that this curved surface will be aspherical.

The fourteenth means is a method for manufacturing a spectacle lens, involving the design and manufacture of left and right spectacle lenses that make up a pair of spectacles in which the prescription including diopter is different for the left and right eyes, wherein, if there is more than a specific amount of difference in the prescription including diopter between the left and right eyes:

when the refractive surfaces in front of the left and right spectacle lenses are termed the first refractive surfaces and the refractive surfaces on the eye side are termed the second refractive surfaces, in designing the curvature of the curved surfaces of the first and second refractive surfaces of the left and right spectacle lenses, the curvature of the first and second refractive surfaces of at least one of the left and right spectacle lenses is selected so that the left and right spectacle lenses satisfy their respective prescription conditions including the diopter so that the difference in the curvature of the first refractive surfaces between the left and right spectacle lenses falls within a specific range.

The fifteenth means is a method for manufacturing a spectacle lens, involving the design and manufacture of left and right spectacle lenses that make up a pair of spectacles in which the prescription including diopter is different for the left and right eyes, wherein, if there is more than a specific amount of difference in the prescription including diopter between the left and right eyes:

when the refractive surfaces in front of the left and right spectacle lenses are termed the first refractive surfaces and the refractive surfaces on the eye side are termed the second refractive surfaces, in designing the curvature of the curved surfaces of the first and second refractive surfaces of the left and right spectacle lenses, the curvature of the first and second refractive surfaces of at least one of the left and right spectacle lenses is selected so that the left and right spectacle lenses satisfy their respective prescription conditions including the diopter, so that the optical performance of each lens falls within an acceptable range, and so that the difference in the curvature of the first refractive surfaces between the left and right spectacle lenses falls within a specific range.

The sixteenth means is the method for manufacturing a spectacle lens pertaining to the fourteenth or fifteenth means, wherein the difference in the diopter between the left and right eyes is at least 0.5 D when the diopter prescription out of said prescription including the diopter includes a positive diopter, the difference in the diopter between the left and right eyes is at least 1 D when the diopter prescription includes a negative diopter, and the difference in the curvature of the first refractive surfaces of the left and right spectacle lenses is no more than 1 D.

The seventeenth means is the method for manufacturing a spectacle lens pertaining to the fifteenth means, wherein the optical performance consists of one or more of astigmatism, curvature of field, and distortion.

The eighteenth means is the method for manufacturing a spectacle lens pertaining to the fifteenth means, wherein the curvature of one or both of the first refractive surfaces of the left and right spectacle lenses is selected such that this curved surface will be aspherical.

BRIEF DESCRIPTION OF THE DRAWINGS

FIG. 2 is a diagram illustrating the auto-entry screen on which the type of lens is specified;

FIG. 4 is a diagram illustrating an example of part of the contents of a customer database;

FIG. 15 is an astigmatism diagram for −4.0 D;

FIG. 16 is a table of the radius of curvature, etc., of a new prescription lens (aspherical design −4.0 D) obtained by redesign;

FIG. 17 is an astigmatism diagram for a lens produced from the design table in FIG. 16;

FIG. 23 is an example of a lens design table for a positive lens spherical design (+1.00 D, +3.00 D);

FIG. 24 consists of astigmatism diagrams for lenses produced by spherical design, with (a) illustrating the case for the left eye and (b) for the right eye;

FIG. 25 is a table of the radius of curvature, etc., of a lens after redesign;

BEST MODE FOR CARRYING OUT THE INVENTION

Figure 1:
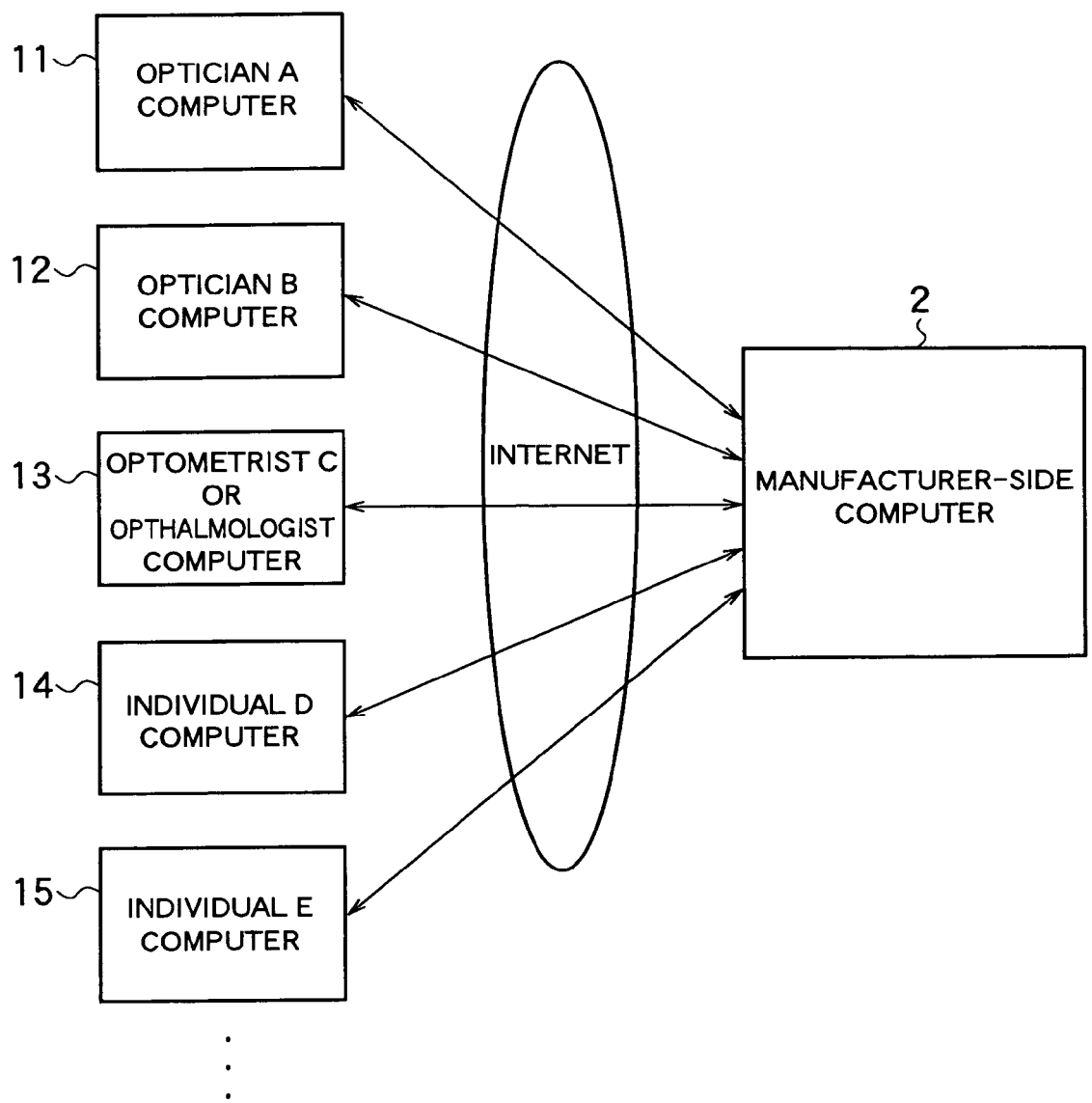
FIG. 1 is a diagram illustrating the simplified structure of the spectacle lens supply system pertaining to an embodiment.
Figure 3:
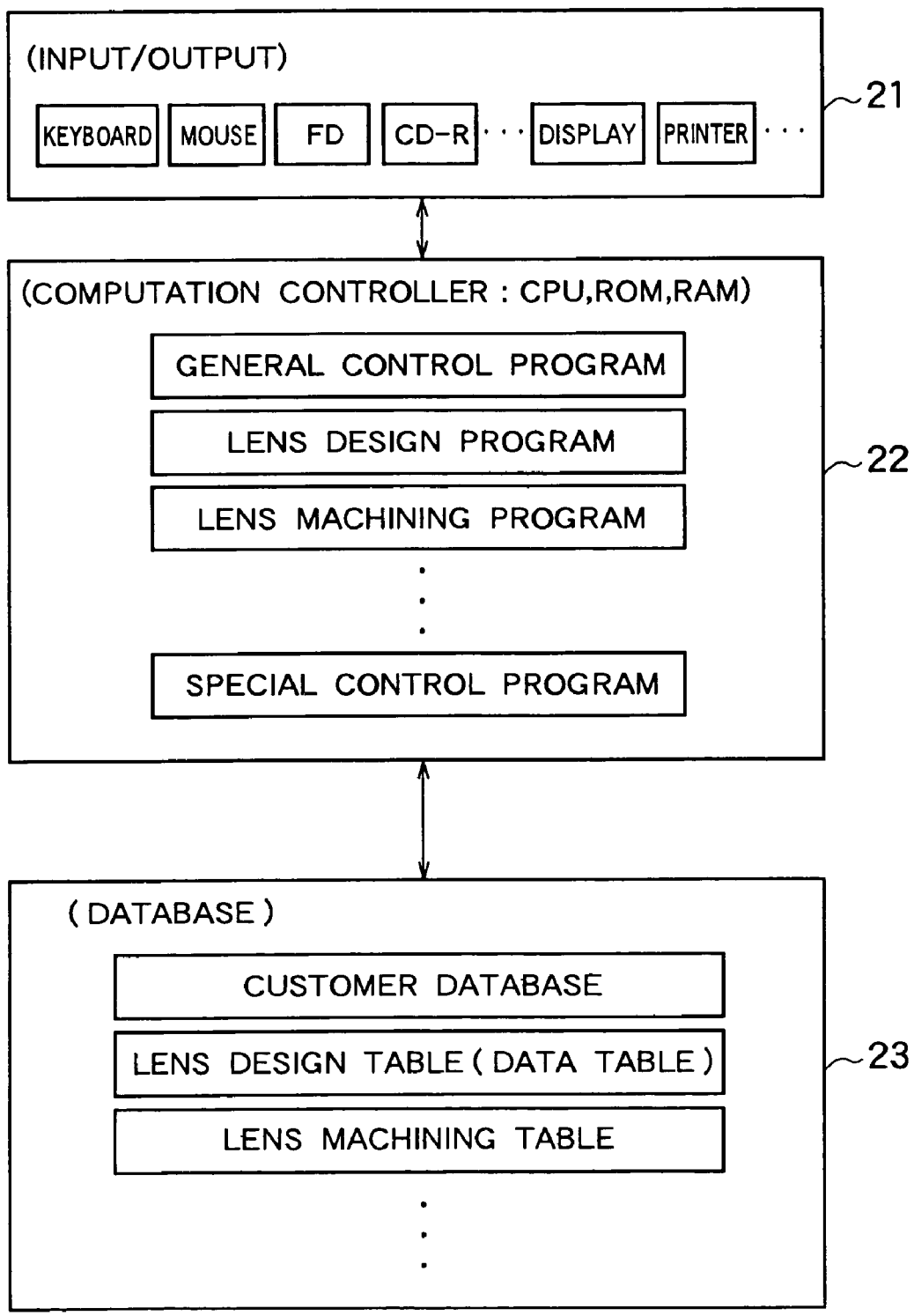
FIG. 3 is a block diagram of a manufacturer-side computer.

FIG. 1 is a diagram illustrating the simplified structure of the spectacle lens supply system pertaining to an embodiment, FIG. 2 is a diagram illustrating the auto-entry screen on which the type of lens is specified, FIG. 3 is a block diagram of a manufacturer-side computer, and FIG. 4 is a diagram illustrating an example of part of the contents of a customer database. The spectacle lens supply system pertaining to an embodiment of the present invention will now be described through reference to these drawings.

In FIG. 1, computers 11, 12, 13, 14, and 15 are installed as order-side terminal computers at optician offices A and B, an optometrist or opthalmologist office C, and individuals D and E, respectively. These are connected to a manufacturer-side computer 2 via the internet or a dedicated communications line. The order-side terminal computers 11, 12, 13, 14, and 15 are part of a system that allows orders for spectacle lenses to be placed by exchanging information with the manufacturer-side computer 2 according to the instructions on a screen. Specifically, information related to producing spectacles, such as prescription values, lens information, frame information, and layout information, is transmitted as data to the manufacturer-side computer 2, and the order type (such as unmachined circular lens, beveled lens, or spectacles) is specified by following the instructions on the screen, the result being that the data necessary for that order is supplied from the manufacturer-side computer 2 and the order processed.

FIG. 2 is a diagram illustrating the auto-entry screen used to specify the type of lens. As shown in the figure, the type of lens is specified in section 61. That is, the manufacturer's product category code is inputted, which specifies the lens material, refractive index, coating, lens coloring, optical design of the lens surface, outside diameter, and so forth. When there is an inquiry, two types of lens can be specified. The "type" in section 65 specifies whether the lens being ordered or inquired about is a lens that has already been beveled (HELP) or one that has yet to undergo edging or beveling. The "METS machining" in section 65 specifies machining so that the thickness of the lens will be the minimum required, or specifies chamfering to smooth off the edges of negative lens, or polishing of this portion.

Whether or not "binocular vision balance design" will be performed is specified by input in section 62. "Binocular vision balance design" includes, of course, having the left and right lenses satisfy the prescription conditions within the specified range, but also means keeping the difference in optical performance between the left and right lenses within the specified range, and also keeping the difference in curvature (base curve) of the first surfaces (first refractive surfaces) of the left and right lenses within the specified range, and thereby striking a good balance between left and right in terms of appearance when the spectacles are worn, and making the spectacles more attractive. FIG. 2 illustrates a case in which "yes" has already been specified on the order side for the binocular vision balance design, but the lens design program in this example automatically checks the binocular vision in both eyes.

While not shown in the drawing, a software menu is displayed at the bottom of the auto-entry screen in FIG. 2. Displayed on the screen here are a send key for sending registered data, a register key for registering the screen inputted data, an order key for switching the screen to the order screen, a clear key, a page specification key, and an end key for ending a registration. These screen keys are selected by using the function keys on the keyboard of the terminal computer 11, for instance. The color of the lens is specified in section 61.

The prescription values for the lens, such as the spherical refracive power of the left and right eyes, the cylindrical refractive power, the cylindrical axis, and the addition, are inputted on the left side in section 62, and similarly, machining instructions for the lens are inputted on the ride side in section 62, information about the spectacle frame is inputted in section 63, and layout information such as the PD, NPD (near PD), SEG (segment cylinder position, ET (minimum edge thickness), and EP (eye point), as well as the beveling mode and the beveling form (including beveling position) is inputted in section 64. The layout information specifies the eyepoint position, which is the pupil position above the spectacle frame.

Frame information can be inputted two ways. The manufacturer's product category code (frame number) can be inputted, allowing an individual with no frame measurement apparatus to place an order from his or her terminal via the Internet, or the frame can be measured directly and this data inputted. Also, frame information such as frame size, material, color, shape, and edge type can be inputted all at once, and in the case of an "inquiry," if only one type of lens has been specified, then up to two types of frame can be specified.

The "machining 1" to "machining 3" on the auto-entry screen are for inputting general machining instructions. Various lens machining instructions can be inputted, such as lens center thickness, edge thickness, prism, decentration, outside diameter, and lens front curve (base curve).

Whether "binocular vision balance design" is to be specified or not is inputted by "yes" or "no."

Depending on where the beveling will be performed along the lens edge, the beveling mode can be "1:1," "1:2," "conform to convexity," "conform to frame," or "auto-beveling." One of these is selected and inputted. "Conform to convexity" is a mode in which the beveling is performed along the lens surface (front side).

Inputting the bevel position is only effective when the beveling mode is "conform to convexity," "conform to frame," or "auto-beveling." The user specifies how far back the bottom of the beveling surface is to be located from the front side of the lens, and specifies this in 0.5 mm units. Even if the frame is thick and there is considerable distance from the front of the frame to the bevel groove, inputting this bevel position allows the bevel vertex to be positioned so that the front of the lens will follow along the front of the frame.

The bevel form can be selected from among "standard bevel," "combination bevel" (beveling for combination frames), "grooved," and "flat." A "combination bevel" is specified when decorative pieces are provided to the frame, so that the lens will not hit these decorative pieces. "Grooved" or "flat" is specified in section 70.

The manufacturer-side computer 2 receives customer information pertaining to an order (such as prescription values) from the order-side computer 11, lenses, etc., are manufactured according to the order, and these lenses are assembled into spectacles and supplied to the customer. This ordering data and machining data are also included in the customer database.

While not depicted, this manufacturer-side computer 2 is also connected to machining or measurement apparatus in the factory, or to a stock control system, accounting control system, ordering system, or any of various other systems required for taking and placing orders.

As shown in FIG. 3, the manufacturer-side computer 2 has an input/output unit 21, an arithmetic and control unit 22, a database 23, and so forth. The input/output unit 21 is equipped, for example, with input means comprising a keyboard, a mouse, a floppy disk (FD), a CD-R, etc., and output means comprising a display, a printer, etc. The arithmetic and control unit 22 comprises a CPU, ROM, RAM, etc., and in addition to standard control programs found on ordinary computers, a lens design program, lens machining program, special control program, and so forth are installed.

The lens design program includes an optical design program for calculating the curve of the lens surface, lens thickness, and so forth while accessing the database 23, an optical performance comparison program for determining and comparing the optical performance for astigmatism, a base curve adjustment program, a lens weight calculation program, and other programs needed for lens design.

The lens machining program includes programs for producing machining data by compiling the data required for lens machining, such as lens refractive surface shape, lens edge shape, and beveling form, while accessing the database 23.

The special control program includes a customer database read/write program and data verification program or accesses a customer data file or the like and executing data reading, verification, storage (including temporary storage), writing, update, new addition, and so forth, or a graphic display program for lens shape and lens thickness comparison tables, for instance. The database 23 holds a customer database, lens design tables (lens data tables), lens machining tables, and so forth.

FIG. 4 illustrates an example of part of the contents of a customer database, and shows the format displayed on the display screen. The example shown in FIG. 4(a) is a table listing personal data such as customer ID, sex, name, telephone number, address, date of birth, age, occupation, hobbies, ordering lab, order date, the name of the office placing the order, office address, and office telephone number. The example shown in FIG. 4(b) is a "first-time prescription registration," consisting of a table listing prescription information when a specific customer places an order for the first time, and a table listing data such as the type of condition (such as myopia or astigmatism), symptoms (primary complaint), intended use, number of orders, lens prescription values, and frame prescription. SPH stands for spherical diopter, CYL stands for cylindrical diopter, AXS stands for cylindrical axis. ADD stands for addition, PD stands for distance between pupils, VA stands for naked eye visual acuity, R stands for the right eye, and L stands for the left eye. When the same customer places an order for the second time, a "second-time prescription registration" is produced and put in the customer's file.

Figure 5:
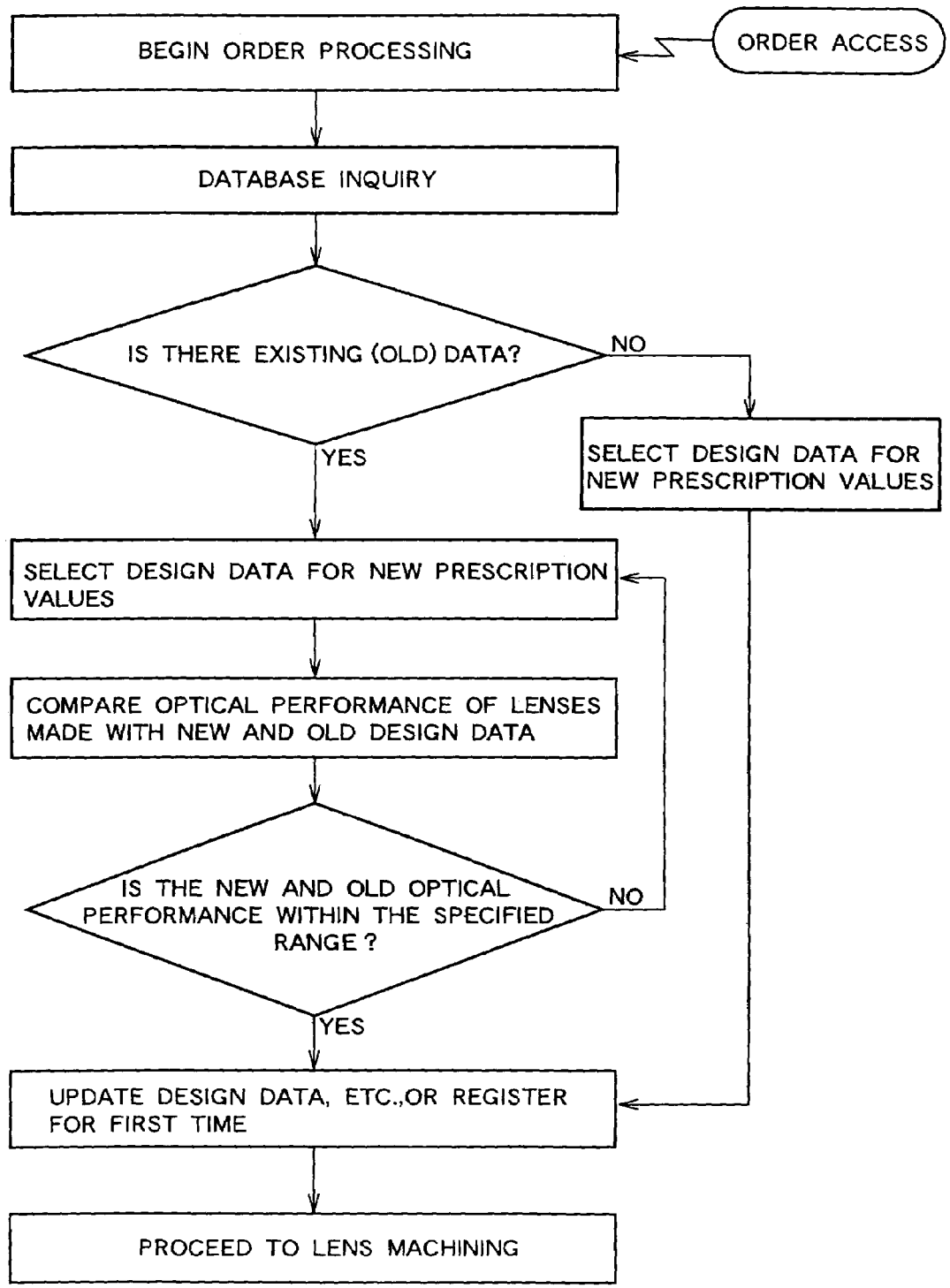
FIG. 5 is a flow chart of the processing involved in taking an order.

FIG. 5 is a flow chart of the processing involved in taking an order. An example of the processing from the placing of an order for spectacle lenses up to their supply, by means of a spectacle lens supply system having the structure discussed above, will now be described through reference to FIG. 5.

Placing an Order

A patient receives an eye examination at an optometrist's or opthalmologist's office, and takes the prescription to an optician office A, for example. At the optician office A, the customer's information, prescription values, and so forth are inputted according to the instruction screen on an order-side computer 11 installed at the office, and the customer's frame specifications, spectacle machining specifications, and other such information necessary for ordering spectacle lenses is determined. The order screen of the order-side computer 11 (the auto-entry screen in FIG. 2) is then used to access the manufacturer-side computer 2 via the internet, the customer's order information, such as prescription values and various specifications, are sent, and the order is processed.

Inquiry to the Customer Database

Order processing commences when order access occurs from the order-side computer 11, etc. First, an inquiry is made as to whether the customer database contains an existing data file for the customer in question.

Comparison of New and Old Prescription Values

If there is existing (old) data (that is, past data), then it is called up as a result of the above-mentioned inquiry. Otherwise, binocular vision balance design, base curve comparison, and optical performance comparison are performed, new design data accomplished the new prescription values is produced and newly registered in a file, and the procedure moves on to lens machining and so forth. How the new design data is produced will be discussed below.

If there is existing (old) data (that is, past data), the lens prescription values contained in the called-up old data (that is, the old prescription values) are compared with the lens prescription values contained in the new data sent in the course of a new order (that is, the new prescription values). A decision is then made as to whether the difference between the old and new prescription values is within a specific range. Specifically, it is decided, for instance, whether the difference in diopter is over 0.5 D.

The lens prescription values referred to here include the spherical diopter (abbreviated as SPH), the cylindrical diopter (CYL), the cylindrical axis (AXS), and the addition (ADD).

Selecting Lens Design Data for New Prescription Values

If it is decided that the difference between the old and new prescription values is within the specified range, new design data based directly on the new prescription is usually read out from the lens design data table, additions or other update registration process necessary for the file is performed, and the procedure then moves on to lens machining. Specifically, the step of comparing the optical performance and redoing the design on the basis of this comparison (adjusting optical performance), which will be discussed below, is omitted.

However, the optical performance adjustment discussed below (including curve matching; that is, comparison and redesign of optical performance) may still be performed after the new design data has been selected even if the difference between the old and new prescription values is within the specified range. In this case, as long as the new and old prescription values (such as diopter) are within the specified range, whether or not the optical performance is adjusted will usually end up having substantially no effect on lens design, so this adjustment may be skipped.

On the other hand, the above-mentioned step of adjusting optical performance is performed if the difference between the old and new prescription values is over the specified range.

Comparison of Optical Performance for Old and New Lenses

Next, the optical performance of the new lenses designed using this new design data is determined, and the new lens optical performance is compared to the optical performance of the old lenses. "Optical performance" as used here refers to astigmatism, curvature of field, distortion, etc.

If, as a result of this comparison of the optical performance of the old and new lenses, the difference in optical performance is within the specified range, that design data is employed, file update registration and so forth are performed, and the procedure moves to lens machining.

On the other hand, if the comparison of the optical performance of the new and old lenses indicates that the difference in optical performance exceeds the specified range, then other new design data accomplished the new prescription values is selected or produced again, and the same processing is repeated until the difference in optical performance falls within the specified range.

"Specified range" as used here means that as a result of comparing the optical performance, the optical performance difference is within a range such that the customer will experience substantially no discomfort originating in an optical performance difference when changing from old to new lenses. These ranges are empirically determined according to astigmatism, curvature of field, distortion, and so on.

The above is a summary of the spectacle lens supply system pertaining to an embodiment, and the following are specific examples of how to select or product the lens design data so that the optical performance will fall within the specified range (this is called optical design). These examples involve design in which the object point is infinity.

How to Select or Produce Lens Design Date

First, an example of a negative lens will be described. Let us assume, for instance, that the previous prescription (old prescription; old lenses) was for a spherical diopter of −2 D, while the current prescription (new prescription; new lenses) is for −4 D. Specifically, the old prescription was for −2 D for both the left and right eyes, while the new prescription is for −4 D for both the left and right eyes due to a change in visual acuity.

Figures 6, 7, 8:
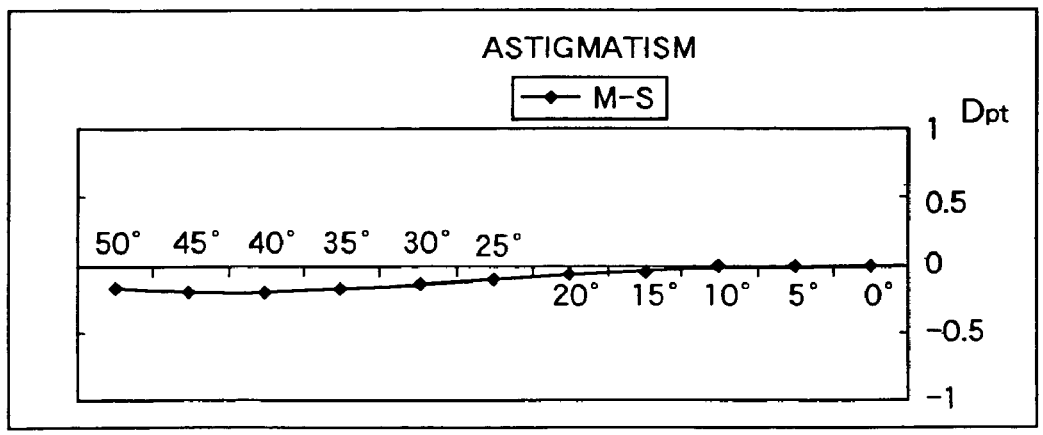
FIG. 6 is a design table (lens data table) for a lens of −2.0 D spherical design.
FIG. 7 is a design table (lens data table) for a lens of −4.0 D spherical design.
FIG. 8 is an astigmatism diagram for −2.0 D.
Figure 9:
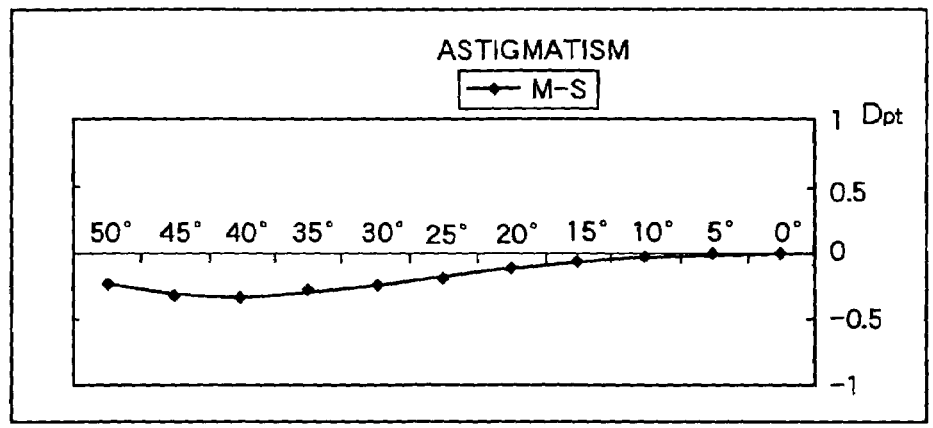
FIG. 9 is an astigmatism diagram for −4.0 D.

Once the step of design data selection for the new prescription values is reached, the lens design program is started, and the lens design table (lens data table) for spherical design, which has been produced according to various prescriptions, is read out from the database 23. FIGS. 6 and 7 are design tables (lens data tables) for lenses with −2.0 D and −4.0 D spherical design. The refractive index of the lenses is 1.50. FIGS. 8 and 9 are astigmatism diagrams for new and old lenses design using the values from the above tables. The vertical axis in these drawings is the angle of the field of vision (units: degrees), while the horizontal axis is the astigmatism based on the refractive power on the optical axis (units: D, the difference (m−s) between the meridional direction (m) and the sagittal direction (s)).

It can be seen from FIGS. 8 and 9 that the astigmatism of the new lenses (of the new design) is worse than that of the old lenses. When the astigmatism is worse, there is a higher probability that the customer will experience discomfort. Worsening of astigmatism around the periphery of the field of vision when the customer changes spectacles is believed to be a particular cause of such discomfort.

Figure 10:
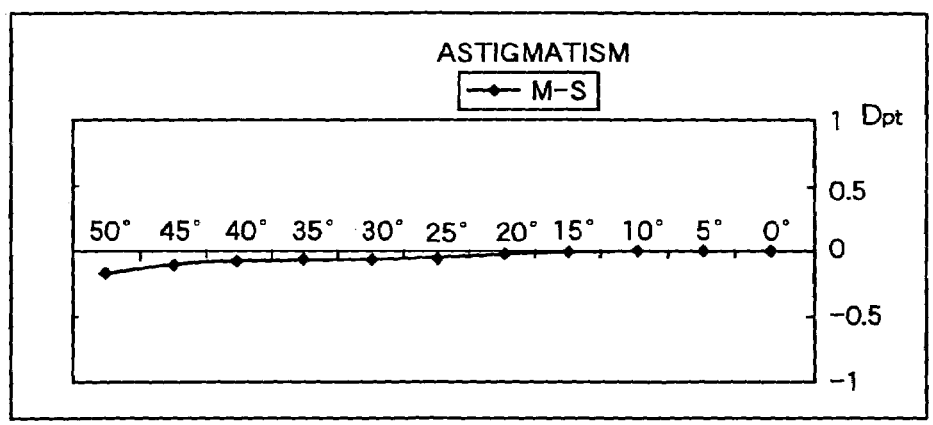
FIG. 10 is an astigmatism diagram of a new prescription lens (aspherical design −4.0 D) obtained by redesign.

In view of this, in this embodiment, astigmatism is improved by changing the first surface of the −4 D lens, which has a spherical design, to an aspherical surface by the method described below. FIG. 10 is an astigmatism diagram of a new lens obtained by aspherical design. In this aspherical design, though, there is no change to the radius of curvature at the vertex. As can be seen from FIGS. 9 and 10, astigmatism is improved by changing the first surface to an aspherical surface, and the optical performance is the same as that shown in FIG. 8, which is a −2 D astigmatism diagram.

How to Design a Lens with Equivalent Optical Performance

Figure 11:
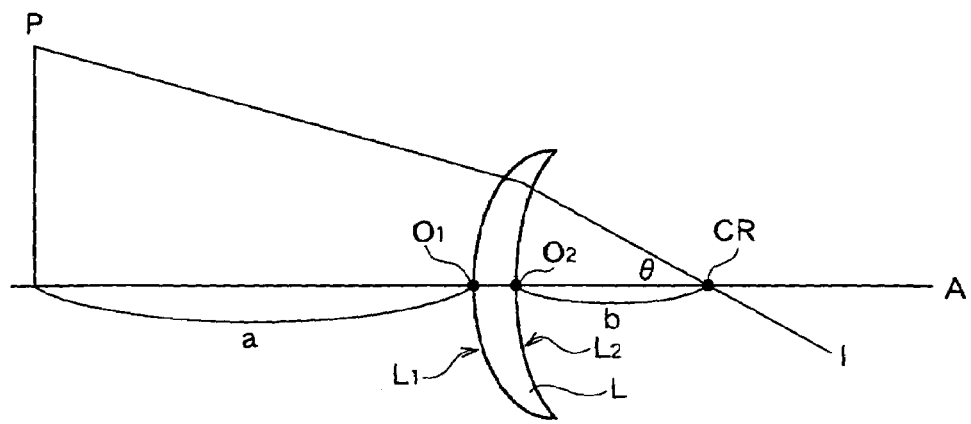
FIG. 11 is a diagram illustrating the principle of a ray tracing method.

One method for determining a curved surface having a curvature that results in equivalent optical performance is a method utilizing ray tracing and Spencer's formula. FIG. 11 is a diagram illustrating the principle of a ray tracing method. A positive lens will be used as an example here for the sake of convenience. FIG. 11 deals with a hypermetropic lens and an object point at infinity. A ray 1 is sent out backwards from the center of rotation CR at an angle of θ to the optical axis A, and the position of a point P that lies in the object plane at a distance an ahead of the vertex O1 of a first refractive surface L1 of the lens L is determined. This ray 1 is called the chief ray. Next, starting from point P, the image position m in the meridional direction and the image position s in the sagittal direction after the chief ray 1 has been refracted through the lens L are calculated, and the amount of astigmatism (m−s) is calculated (for details, see OUYOU BUTSURI, Vol. 26, No. 5,1957, pp. 206–210). In this case, the distance b between the center of rotation CR and the vertex O2 of the second refractive surface L2 of the lens L is 25 mm. A value of 27 mm is used for b in Europe and North America.

Spencer's formula given below (for details, see J. Opt. Soc. Am., 52 (1962), 672) is used for the design formula for determining the curved surface of the lens.

$$X(\rho) = \frac{C\rho^2}{1+\sqrt{1-kC^2\rho^2}} + \sum_{n=2}^{5} An\rho^{2n} \quad \text{[First Mathematical Formula]}$$

Where n is an integer greater than or equal to 2.

X is the distance of a vertical line dropped from a point on an aspherical surface whose distance from the optical axis is ρ to a plane tangent to the aspherical surface vertex, C is the curvature of a reference spherical surface at the vertex of the aspherical surface (C=1/R, where R is the radius of curvature at the vertex), ρ is the distance from the optical axis, K is the conic coefficient, and $A_n$ is the aspherical coefficient of the term $\rho^{2n}$.

After using the above method to find the radius of curvature of the second refractive surface and center thickness, K and $A_n$ are determined by aberration optimization such that the astigmatism will be the specified amount or less.

The refractive power (diopter) of a spectacle lens is generally approximated as the sum of refractive power of the first surface and the refractive power of the second surface, and is expressed in units of diopters (D). The refractive power of the first refractive surface and the second refractive surface (surface refractive power) is defined by the following formula, which includes the curvature ρ of this surface (units of 1/m, radius of curvature R=1/ρ) and the refractive index n of the lens material.

$$\text{Surface refractive power} = (n-1) \times \rho = (n-1)/R \quad (1)$$

The refractive power of the first refractive surface of a spectacle lens is called the base curve.

The curve of lens at an aspherical surface is calculated using the radius of curvature at the vertex.

Examples of when the Prescription is Different for the Left and Right Eyes

Next we will describe an example of when the previous (old) prescription (old lens) was −2 D for both the left and right and eyes, but the current (new) prescription is −2 D for the left eye and −4 D for the right eye. In other words, this is a case in which myopia is more advanced in the right eye for one reason or another.

Figures 12, 13, 14:
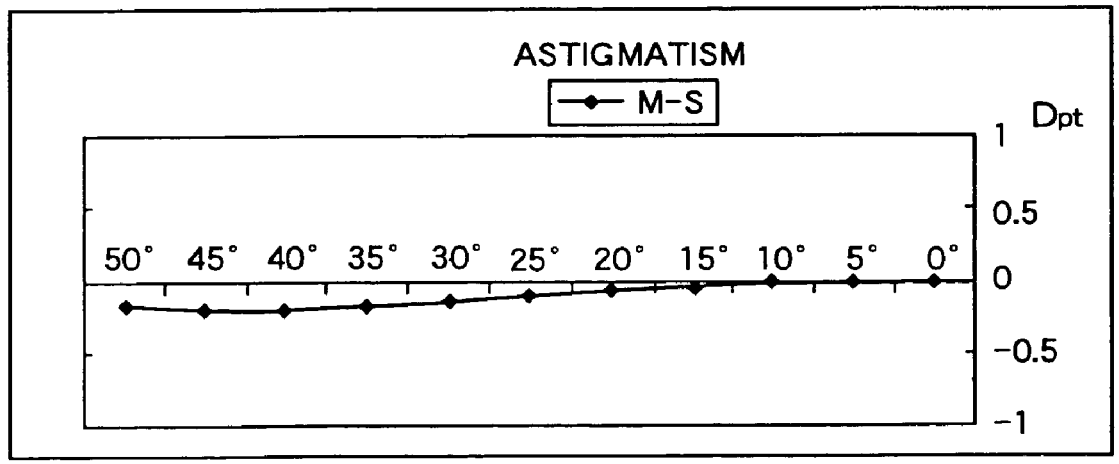
FIG. 12 is a design table (lens data table) for a lens of −2.0 D spherical design.
FIG. 13 is a design table (lens data table) for a lens of −4.0 D spherical design.
FIG. 14 is an astigmatism diagram for −2.0 D.

Just as in the case discussed above, the lens design program reads a lens design table (lens data table) for spherical design, which has been produced according to various prescriptions. FIGS. 12 and 13 illustrate examples of design tables (lens data table) for lenses with spherical design of −2.0 D for the left eye and −4.0 D for the right eye, respectively. The refractive index of the lenses is 1.50.

FIGS. 14 and 15 are astigmatism diagrams for lenses designed using the values in the tables in FIGS. 12 and 13. The vertical axis in these drawings is the angle of the field of vision (units: degrees), while the horizontal axis is the astigmatism based on the refractive power on the optical axis (units: D, the difference (m−s) between the meridional direction (m) and the sagittal direction (s)). It can be seen from these tables the optical performance is worse for the lens for the right eye, in which myopia is more advanced. This is what causes discomfort when the user changes spectacles.

The use of a curve (surface refractive power) along with the radius of curvature is a well known concept when expressing the shape of a spectacle lens. This curve is calculated from the above formula (1). In Formula 1, R is the radius of curvature, in units of m (meters), and n is the refractive index of the lens. Calculating the curve for the first surfaces (first refractive surfaces) using Formula 1 yields values of 3.99 D and 2.99 D, respectively. In this example, the curve difference at the first surfaces (first refractive surfaces) is 1 D between the lenses of the new and old prescriptions.

Thus, when the prescription is different for the left and right eyes, the base curves are generally also different. The spectacles will look odd if the difference is too pronounced (over 1 D). When myopia is more advanced in one eye, as in this example, not only will the optical performance suffer as mentioned above, but the aesthetic appearance of the spectacles will also suffer. In view of this, the base curves of the left and right lens are matched and the optical performance is made the same as with the previous prescription.

How to Design Matching Base Curves

First of all, to eliminate the curve difference, the curved surface shape of the first and second refractive surfaces is determined so as to satisfy the following conditions for the lens on the −4.0 D side.

(a) The design standard should be an aspherical design with an approximated curve on the first refractive surface.

(b) Astigmatism performance should not be compromised as an aspect of optical performance.

The above-mentioned method utilizing ray tracing and Spencer's formula is employed as the method for determining a curved surface having a curvature that satisfies the above conditions. This method was described in detail above.

FIG. 16 is a table listing the radius of curvature and so forth for a new prescription lens obtained by redesign (aspherical design −4.0 D). The refractive index of the lens is 1.50. In this table, the first surface (which is an aspherical surface) radius of curvature indicates the radius of curvature at the vertex of the first surface.

It is clear from this table that an aspherical design is used for the lens shape on the first surface (first refractive surface) of this new design lens, resulting in 125.647 mm (3.98 D), and the lens curve difference has also been corrected to within 1 D. FIG. 17 is an astigmatism diagram for a new prescription lens obtained by new design. As is clear from FIGS. 14 and 17, the optical performance is maintained substantially the same as that before redesign, while the appearance of the spectacles is markedly improved.

As in this example, it is possible to design lenses such that the base curves of the left and right lenses are matched, which maintains the good appearance of the spectacles while the optical performance is kept the same as that obtained with the previous prescription. This means that the wearer will experience no discomfort upon changing spectacles, but at the same time the spectacles will retain their good appearance.

The astigmatism was kept the same in the above example, but it is only necessary for one or more of astigmatism, curvature of field, and distortion to be kept substantially the same. Of the five Seidel aberrations in spectacle lenses, it can be seen that, except in the case of lenses with very high refractive power (diopter), there is no need to factor in spherical aberration or coma aberration because the pupil diameter is smaller than the spectacle lens and the focal length of a spectacle lens is longer (that is, it is a dark optical system with a large F-number), and because the limiting resolution angle (approximately 1') is not that small.

Also, if the only requirement is a good appearance on the convex side, another base curve adjustment method that can be used is to match the base curves in the left and right lenses of the spectacles, treat optical performance as being of secondary importance, and merely matching or approximately matching the convex curves while redesigning the concave side. This situation would occur when "lens table curve specification" was performed from the ordering side in the "machining" box on the above-mentioned auto-entry screen in FIG. 2. It is also possible to adjust the base curve by using a base curve value that is halfway or approximately halfway between the base curves of the left and right lenses.

New Design: When the Same Customer Data Does Not Exist in the Customer Database on the Manufacturer-Side Computer In this case, new optical design is performed, this design data is registered in the customer database, and lens machining is specified. Here, though, the aesthetic appearance and optical performance of the spectacles will be different when the prescriptions of the left and right eyes are different or when there is a pronounced difference in the base curves, so the base curves of the left and right lenses are matched or the optical performance is matched as discussed above. This is accomplished by the method described above.

As mentioned previously, the curvature of the first surface (object side) is different when the prescriptions for the left and right eyes are different. It we look at this in terms of the appearance (aesthetics) of the spectacles, it has been found that there will be a noticeable difference it the appearance of the left and right lenses, giving an unbalanced look, if the curve difference between the left and right lenses is over about 1 D, although this varies somewhat with personal taste. In view of this, in this embodiment, a curve difference over this is considered to result in an imbalance between the left and right lenses, so a redesign program is executed.

Figures 18, 19, 20:
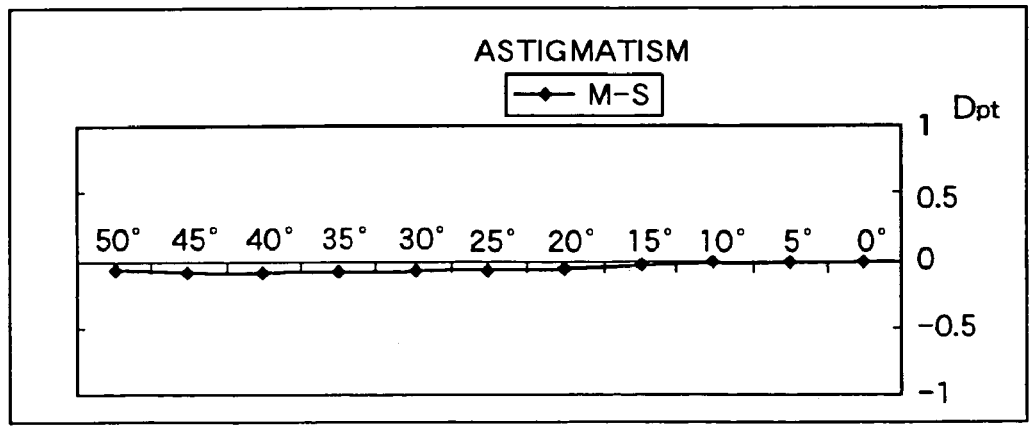
FIG. 18 is a design table for a lens with a spherical design.
FIG. 19 is a table of the radius of curvature, etc., of a lens obtained by redesign (−1.0 D)
FIG. 20 is an astigmatism diagram for a lens produced from the design values (−1.0 D) in the table in FIG. 18.
Figure 21:
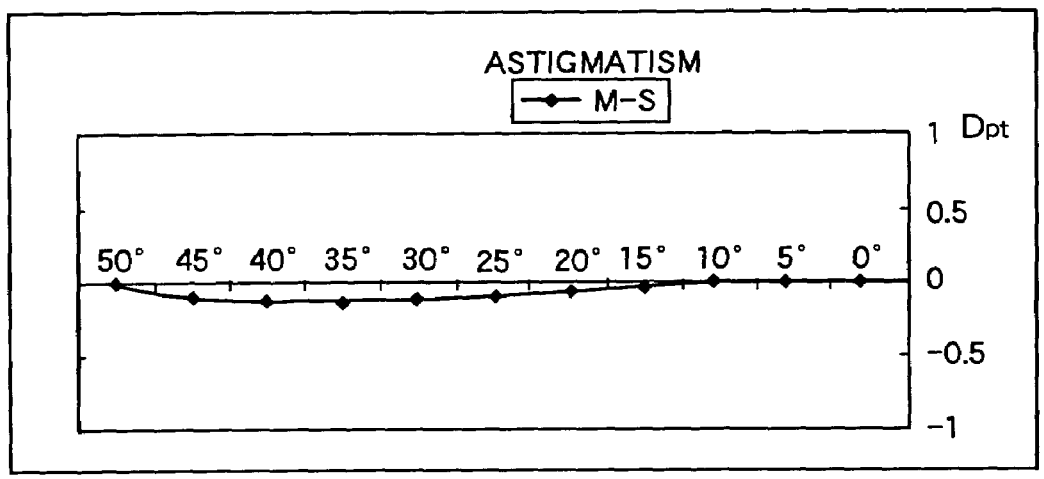
FIG. 21 is an astigmatism diagram for a lens produced from the design values (−3.0 D) in the table in FIG. 18.

For instance, let us assume that the prescription is −1 D for the left eye and −3 D for the right eye. With an existing lens design program, a design table for lenses of spherical designs that have been produced ahead of time according to prescriptions is selected, and the values in this table are used in the design. FIG. 18 illustrates an example of a design table for lenses with a spherical design. The refractive index of the lens is 1.50. FIGS. 20 and 21 are astigmatism diagrams of lenses produced using the design values in the table of FIG. 18. It can be seen from these graphs that astigmatism is favorably corrected.

Calculating the curve for the first surfaces using Formula 1 yields values of 5.50 D and 4.25 D, respectively. In this example, the curve difference at the first surfaces is 1.25 D, and it is easy to see that this will result in an unattractive appearance.

Therefore, just as above, the lens on the −1 D side is subjected to design aimed at eliminating the curve difference. Changing the curve results in inferior optical performance, so along with eliminating the curve difference between the first surface on the −1 D side and the −3 D side, an aspherical surface is used to compensate for the deterioration in optical performance. FIG. 19 is a table listing the radius of curvature, etc., of the lens (left) obtained by redesign. As is clear from this table, this redesigned lens has a first surface (first refractive surface) lens curve difference that has been corrected to within 1 D.

Figure 22:
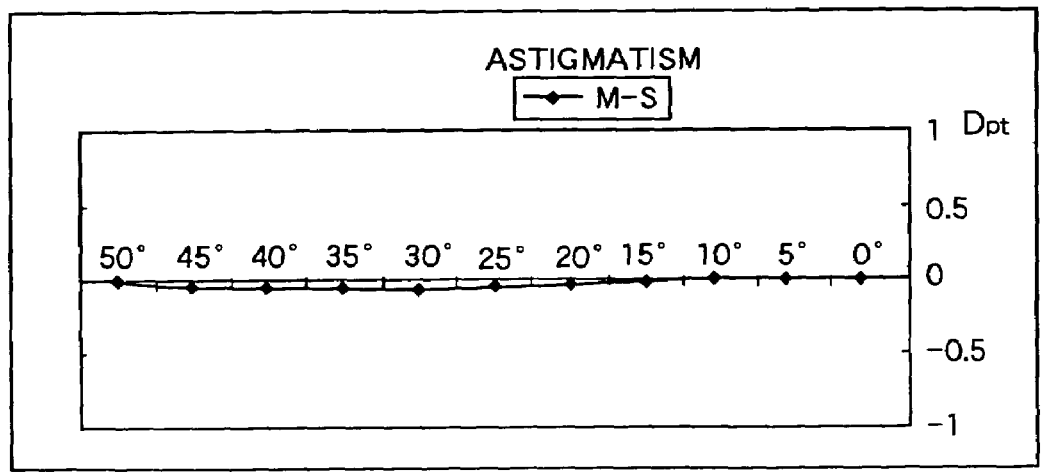
FIG. 22 is an astigmatism diagram for a lens produced from the design values (−1.0 D) in the table in FIG. 19.

FIG. 22 is an astigmatism diagram for the lens (left) obtained by redesign. As is clear from FIG. 22, the optical performance is substantially the same as or better than that prior to redesign, while the aesthetic appearance is markedly improved.

Next, an example in which the prescription is +1 D for the left eye and +3 D for the right eye will be given.

FIG. 23 is an example of a design table (lens data table) for lenses of spherical design. The overall height in the table refers to the height of the entire lens when the lens is viewed from the side in a plane.

FIGS. 24(a) and (b) are astigmatism diagrams of the left and right lenses designed using the values in the above table, respectively. The vertical axis in these drawings is the angle of the field of vision (units: degrees), while the horizontal axis is the astigmatism based on the refractive power on the optical axis (units: D, the difference (m−s) between the meridional direction (m) and the sagittal direction (s)). It can be seen from these graphs that good optical correction is achieved.

Figure 26:
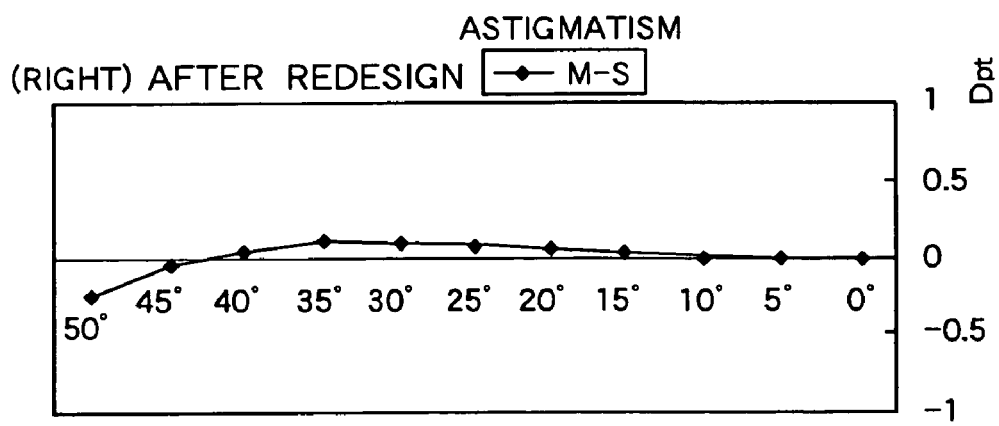
FIG. 26 is an astigmatism diagram for a lens after redesign.
Figure 27:
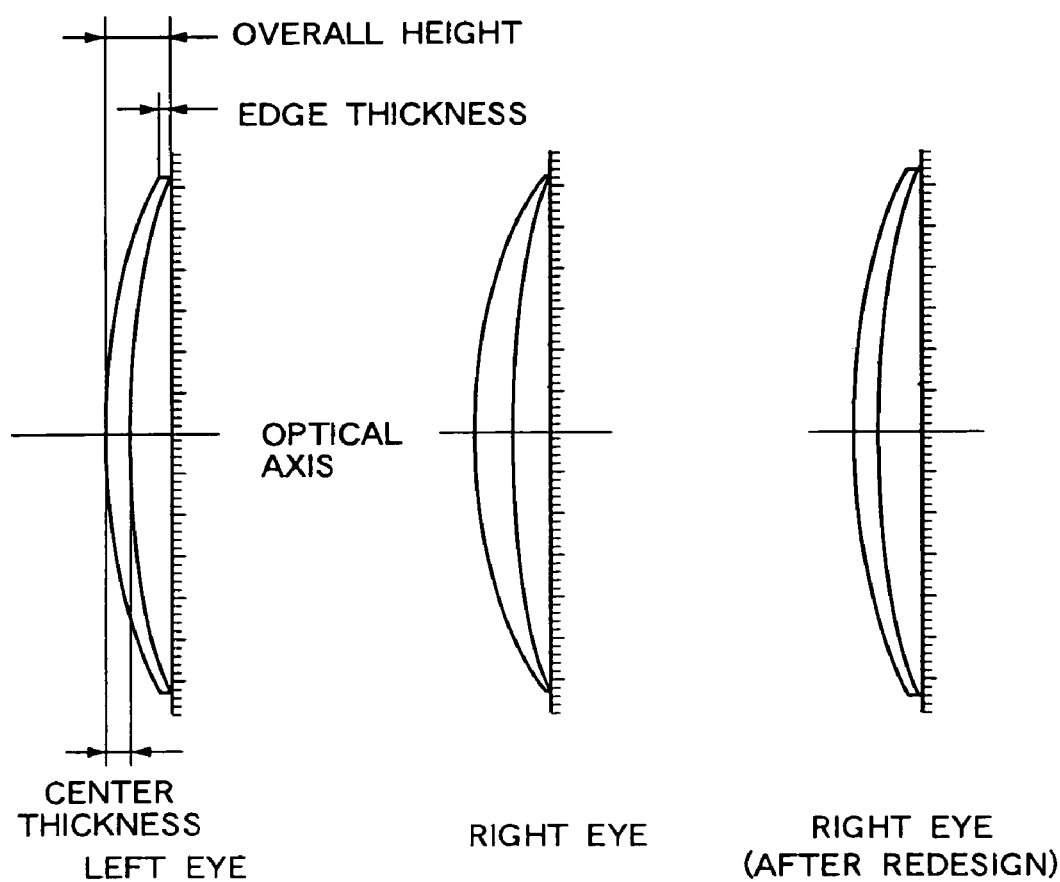
FIG. 27 consists of diagrams illustrating the screen display of the curved surface shape of a lens before and after redesign.

Calculating the curve for the first surfaces (first refractive surfaces) using Formula 1 yields values of 5.46 D and 8.05 D, respectively. In this example, the curve difference at the first surfaces (first refractive surfaces) is 2.59 D between the lenses of the left and right lenses. FIG. 25 is a table listing the radius of curvature, etc., of a lens (right) obtained by redesign, in the table, the first surface (which is an aspherical surface) radius of curvature indicates the radius of curvature at the vertex of the first surface. It is clear from this table that by using an aspherical design for the lens shape on the first surfaces (first refractive surfaces) of these redesigned lenses results in 92.242 mm (5.42 D), and the lens curve difference has also been corrected to within 1 D. FIG. 26 is an astigmatism diagram for a lens (right) obtained by redesign. As is clear from FIG. 26, the optical performance is maintained substantially the same as that before redesign, while the appearance of the spectacles is markedly improved. FIG. 27 consists of diagrams illustrating a screen display comparing the curved surface shape of a lens before and after redesign. It can be seen from FIG. 27 that the curvature of the first surface (first refractive surface) is substantially the same on the left and right as a result of redesign. The base curves of the left and right lenses were adjusted to the shallower curve, but the shallower curve does not necessarily have to be used as the standard, and adjusting to the deeper curve is also possible.

If we consider the shape of the above-mentioned Tscherning's ellipse, which exhibits the optimal base curve in a spectacle lens, we see that with a lens having a negative diopter, the curvature of the base curve tends to become flatter as the diopter of the lens increases. On the other hand, with a lens having a positive diopter, the curvature of the base curve tends to become steadily steeper as the diopter of the lens increases. This is because, as seen with the slope of Tscherning's ellipse, the slope steadily flattens out with a negative lens, while the slope steadily steepens with a positive lens.

Therefore, in implementing the present invention, it is preferable if the difference in the diopter between the left and right eyes is at least 0.5 D in a prescription including a positive diopter, if the difference in diopter between the left and right eyes is at least 1 D in a prescription including a negative diopter, and if the curvature difference of the first refractive surfaces of the left and right spectacle lenses is no more than 1 D.

There are cases when a toric surface or an atoric surface is employed for the second surface of the lens in prescriptions for astigmatism, and this embodiment can, of course, be applied to such prescriptions as well. "Toric surface" here refers to a surface having two orthogonal principal meridians, with each principal meridian having spherical shape, while "atoric surface" refers to a surface in which these principal meridians have an aspherical shape.

Also, in the above example, the lens data table was prepared for prescription lenses with new and old spherical designs, but the lens data table may instead be for aspherical designs. Also, the lens data table in the above example was prepared for left and right single vision lenses, but this lens data table may instead be for multifocal lenses or progressive-power lenses. That is, it is also possible to match the curves of the far portions (the portions used for far vision) and make the optical performance the same.

Lens Machining

As discussed above, when lens design data is selected and data including this selected design data is updated or newly registered, the procedure moves on to the lens machining step. This lens machining step consists of selecting or calculating machining data based on lens design data and so forth, coordinate conversion, determination of the machining start point and machining axis, confirmation calculation of the edge thickness prior to lens machining, machining the lens refractive surface, edging the lens to the frame shape, beveling the edge of the lens, and other such processing. These are carried out by sending machining-related data to the control computers of the various machining devices of the factory which are connected to the manufacturer-side computer 2.

The machined lenses are sent to an optician, optometrist, etc., through a delivery system, accounting system, and so forth. Spectacles are produced in this way. The spectacles thus produced are delivered to the customer via the optician, optometrist, etc. The newly updated or registered database will be useful for the next order. As shown in FIG. 27, data such as optical performance, the lens center thickness, edge thickness, overall height, or weight, or cross sections of the lens, may be transmitted to the order-side computer as desired by the ordering side. In particular, data based on previous prescription values or lens data, such as optical performance, the lens center thickness, edge thickness, overall height, or weight, or cross sections of the lens, can be compared with the current data.

With the spectacle lens supply system pertaining to the above embodiment, the effective use of a customer database makes it possible to supply customers with spectacle lenses that are exactly suited to their needs. Also, since the customer database can be used like an electronic medical chart by updating it every time an order is received, the history of prescription values for a customer can be reviewed, which is useful for medical purposes. Furthermore, since the optical performance is examined and optical design is performed as needed every time an order is received, spectacle lenses having the optical performance best suited to the customer can always be provided. Also, orders for just one lens are sometimes placed by customers who have lost or damaged either the left or right lens, in which case this system can be applied and its advantages fully exploited as long as the optical performance of the remaining lens is known.

In this example, the network system involved connecting the manufacturer-side computer and the order-side computer via the Internet, but a dedicated line or the like can be used instead of the Internet. Furthermore, the network linking the manufacturer-side computer and the order-side computer need not do so directly, and of course may link them indirectly by having a server in between, or by interposing a plurality of manufacturer-side computers from a server, for example, or a plurality of units may be combined.

INDUSTRIAL APPLICABILITY

As described above, the present invention provides a lens design program with a check function so that the optical performance difference or curve difference between left and right lenses and/or old and new lenses will be within a specific range, the result being a spectacle lens supply system with which it is possible to supply lenses that cause no discomfort between the left and right eyes or in a change from old lenses produced with an old prescription to new lenses produced with a new prescription.

The invention claimed is:

1. A spectacle lens supply method, in which a computer is set up on a spectacle lens order side and a computer that is connected to this order-side computer such that information can be mutually exchanged is provided on a manufacturer side, and spectacle lenses are supplied by having the order-side computer and the manufacturer-side computer perform computations according to specific input operations and perform the processing required for the taking and/or placing of orders for spectacle lenses while exchanging information with each other, wherein when spectacle lens information, spectacle frame information, prescription values, layout information, processing instructions information, and other such processing condition data required for processing is transmitted by the order-side computer to the manufacturer-side computer, then on the basis of the transmitted data for lens information, when the difference in prescription between left and right eyes is over a specific amount, a lens design program installed on the manufacturer-side computer performs optical lens design tailored to the customer by making a convex surface side an aspherical shape so that base curves on left and right convex surface sides approximate each other and at least one optical performance of left and right spectacle lenses, which is selected among astigmatism, curvature of field, and distortion, is similar, and the difference in convex surface base curves of the left and right spectacle lenses is not more than 1D, and its design result is displayed on the order-side computer, so that a person placing an order can compare and confirm data including the lens shape before the curve matching and the prescription data for this lens, and data including the lens shape after the curve matching and the prescription data for this lens.

2. The spectacle lens supply method according to claim 1, wherein the spectacle lens is a single vision lens.

3. The spectacle lens supply method according to claim 1, wherein the optical lens design is such that the difference in convex surface base curves of the left and right spectacle lenses is not more than 1 D.

4. The spectacle lens supply method according to claim 1, wherein a display means for comparing data including the lens shape before the curve matching and the prescription data for this lens, to data including the lens shape after the curve matching and the prescription data for this lens, is transferred to and displayed at the computer set up on the side where spectacle lens is ordered.

* * * * *